(12) United States Patent
Reed

(10) Patent No.: US 10,810,691 B2
(45) Date of Patent: Oct. 20, 2020

(54) RECOMMENDING AND/OR ARRANGING TRAVEL PLANS IN RESPONSE TO THE SELECTION OF PICTORIAL REPRESENTATIONS BY ONE OR MORE USERS

(71) Applicant: Brandon Arthur Reed, Kirland, WA (US)

(72) Inventor: Brandon Arthur Reed, Kirland, WA (US)

( * ) Notice: Subject to any disclaimer, the term of this patent is extended or adjusted under 35 U.S.C. 154(b) by 83 days.

(21) Appl. No.: 15/901,798

(22) Filed: Feb. 21, 2018

(65) Prior Publication Data
US 2019/0259111 A1 Aug. 22, 2019

(51) Int. Cl.
| | |
|---|---|
| G06Q 50/14 | (2012.01) |
| G06Q 30/06 | (2012.01) |
| G06F 16/54 | (2019.01) |
| G06F 16/58 | (2019.01) |
| G06F 16/9535 | (2019.01) |
| G06F 3/0482 | (2013.01) |
| G06F 3/0481 | (2013.01) |

(52) U.S. Cl.
CPC ............ *G06Q 50/14* (2013.01); *G06F 16/54* (2019.01); *G06F 16/5866* (2019.01); *G06F 16/9535* (2019.01); *G06Q 30/0631* (2013.01); *G06Q 30/0641* (2013.01); *G06F 3/0482* (2013.01); *G06F 3/04817* (2013.01)

(58) Field of Classification Search
CPC .................... G06Q 30/00–08; G06Q 50/14
See application file for complete search history.

(56) References Cited

U.S. PATENT DOCUMENTS

| 9,916,564 | B1* | 3/2018 | Johns | G06Q 10/10 |
|---|---|---|---|---|
| 2009/0290812 | A1* | 11/2009 | Naaman | G06K 9/4671 382/305 |
| 2011/0301835 | A1* | 12/2011 | Bongiorno | G01C 21/343 705/6 |
| 2014/0236647 | A1* | 8/2014 | Wettan | G06Q 10/025 705/6 |
| 2015/0242927 | A1* | 8/2015 | Will | G06Q 30/0629 705/26.64 |

OTHER PUBLICATIONS

SocialBooker(TM) "Plus-U" is Primed to Help Facebook Drive Value From Its Recent Instagram Acquisition. Publication info: NASDAQ OMX's News Release Distribution Channel ; New York [New York]May 18, 2012. (Year: 2012).*

(Continued)

*Primary Examiner* — Michael Misiaszek
(74) *Attorney, Agent, or Firm* — Perkins Coie LLP

(57) ABSTRACT

A user interface facility is described. The facility receives an indication that a trip is to be planned for one or more travelers including a first user. In response to receiving this indication, the facility causes to be displayed to the first user a multiplicity of pictorial representations, each of the displayed pictorial representations conveying one or more travel interests. For each of a plurality of pictorial representations among the displayed pictorial representations, the y: receives user input selecting the displayed pictorial representation; and, in response to receiving the user input, causes redisplay of the displayed pictorial representation in a manner that visually reflects that it has been selected.

25 Claims, 23 Drawing Sheets

(56) References Cited

OTHER PUBLICATIONS

The Trip Itinerary Optimization Platform: A Framework for Personalized Travel Information. Ted Kwasnik, Steve Isley, Scott P. Carmichael, Joshua B. Sperling, and Doug Arent. National Renewable Energy Laboratory NREL/TP-6A80-67241, Nov. 2017 (Year: 2017).*

Travelocity Strengthens Hotel and Totaltrip Dynamic Packaging Offerings; Ability to Book Multiple Rooms for Small Groups in One Hotel or TotalTrip Reservation, TotalTrip Savings Calculator Helps Travelers Better Determine the Best Valued Trips. Business Wire ; New York [New York]Oct. 10, 2005: 1. (Year: 2005).*

* cited by examiner

| travel choice ID | travel choice description | travel choice cost | travel choice booking information |
|---|---|---|---|
| 1145 | Mexi Maxi | $40@ | 786-111-3241 |
| 2341 | Chez Mole | $50@ | 305-888-0191 |
| 5783 | Taco Truck Livin' | $10@ | 123 W. Anderson St. |
| 6623 | Bonjuor Beach Hotel | $420/night | max 4 guests; hotelresv(5876) |
| 6726 | Essex House residence | $600/night | max 6 guests; bookstay(199104) |
| 6981 | Taylor family residence | $480/night | max 4 guests; bookstay(998776) | travel choice table — 400
401, 402, 403, 404
411, 412, 413, 414, 415, 416

*FIG. 4* travel choice metadata table — 500

| travel choice ID | metadata tag | |
|---|---|---|
| 1145 | food:mexican | — 511 |
| 1145 | food:mexican-fancy | — 512 |
| 2341 | food:mexican | — 513 |
| 2341 | food:mexican-fancy | — 514 |
| 5783 | food:mexican | — 515 |
| 5783 | food:mexican-casual | — 516 |
| 6623 | lodging:hotel | — 517 |
| 6623 | lodging:hotel-beach | — 518 |
| 6623 | setting:beach | — 519 |
| 6726 | lodging:house | — 520 |
| 6726 | lodging:house-beach | — 521 |
| 6726 | setting:beach | — 522 |
| 6981 | lodging:house | — 523 |
| 6981 | lodging:house-beach | — 524 |
| 6981 | setting:beach | — 525 |

| pictorial representation table | | ⟵ 700 |
|---|---|---|
| pictorial representation ID | pictorial representation data | |
| 146 | ... | ⟵ 711 |
| 148 | ... | ⟵ 712 |
| 150 | ... | ⟵ 713 |
| 152 | ... | ⟵ 714 |
| 154 | ... | ⟵ 715 |
| 156 | ... | ⟵ 716 |
| 158 | ... | ⟵ 717 |
| 160 | ... | ⟵ 718 |
| 162 | ... | ⟵ 719 |
| 164 | ... | ⟵ 720 |
| 166 | ... | ⟵ 721 |
| 168 | ... | ⟵ 722 |
| 170 | ... | ⟵ 723 |
| 172 | ... | ⟵ 724 |
| 174 | ... | ⟵ 725 |
| 176 | ... | ⟵ 726 |
| 178 | ... | ⟵ 727 |

701     702

FIG. 7 pictorial representation metadata table — 800

| pictorial representation ID | metadata tag | |
|---|---|---|
| 146 | setting:mountain | — 811 |
| 148 | lodging:house | — 812 |
| 150 | setting:desert | — 813 |
| 152 | setting:beach | — 814 |
| 154 | activity:golf | — 815 |
| 156 | food:italian | — 816 |
| 158 | food:japanese | — 817 |
| 158 | food:japanese-sushi | — 818 |
| 160 | activity:snowmobiling | — 819 |
| 160 | setting:wintery | — 820 |
| 162 | activity:museum:art | — 821 |
| 164 | activity:birdwatching | — 822 |
| 166 | food:mexican | — 823 |
| 168 | activity:sailingtour | — 824 |
| 170 | setting:beach-ocean | — 825 |
| 172 | setting:beach-lake | — 826 |
| 174 | lodging:hotel | — 827 |
| 176 | food:mexican-casual | — 828 |
| 178 | food:mexican-fancy | — 829 |

| user ID | authentication credentials | name | payment information | traveler information |
|---|---|---|---|---|
| 11111 | ... | Jill Henry | cc: 0987 3147 7653 1783 | passport: 7438930392 |
| 22222 | ... | Phil Braxton | cc: 8373 1321 8321 9373 | ff: Ajax Air |
| 33333 | ... | Cindy Charles | cc: 9423 9143 9003 8420 | sp: aisle seats |
| 44444 | ... | Davis Wright | cc: 8431 3913 4132 4987 | KT: 8392033 |
| 55555 | ... | Andrea Hill | cc: 5371 8721 0913 3045 | ff: Zinga |

*FIG. 10* trip table 1200

| trip ID | creating user user ID | budget | start date | end date | geographic scope |
|---|---|---|---|---|---|
| 342512 | 33333 | $6,000 | 5-May-18 | 12-May-18 | |
| 403243 | 22222 | $12,500 | 1-Jun-18 | 10-Jun-18 | 97131 + 1500 miles |

*FIG. 12* participating user table 1300

| trip ID | participating user user ID |
|---|---|
| 342512 | 11111 |
| 342512 | 33333 |
| 342512 | 44444 |
| 342512 | 55555 |
| 403243 | 22222 |

*FIG. 13*

| trip ID | user ID of selecting user | pictorial representation ID of selected pictorial representation |
|---|---|---|
| 342512 | 11111 | 152 |
| 342512 | 33333 | 166 |
| 342512 | 33333 | 154 |

RECOMMENDING AND/OR ARRANGING TRAVEL PLANS IN RESPONSE TO THE SELECTION OF PICTORIAL REPRESENTATIONS BY ONE OR MORE USERS

BACKGROUND

People travel for a variety of purposes, including business meetings, vacations, family events and obligations, charitable pursuits, and educational opportunities.

A prospective traveler can use computer-based tools to plan a trip, and reserve or purchase its components. For example, a prospective traveler can use a web browser to visit a travel website and select and purchase the components of a beach vacation to Miami Beach, Fla.

With a conventional travel website, this process proceeds as follows: The prospective traveler chooses and explicitly specifies Miami Beach, Fla. as the location for lodging, and selects sleeping accommodations from those that are displayed in response. The prospective traveler determines that Miami Beach, Fla. is served by the Miami International Airport; specifies the Miami International Airport as a flight destination, and selects particular flights from those that are displayed in response. The prospective traveler searches for sailboat cruises and gourmet Mexican restaurants near Miami Beach, Fla., and selects one or more from those that are displayed. After making these selections, the prospective traveler can use the travel website to reserve and/or purchase the selected accommodations, flights, cruises, and restaurants.

In general, the prospective traveler specifies the above information by typing text, such as by typing text into fields of one or more web forms.

BRIEF DESCRIPTION OF THE DRAWINGS

FIG. 4 is a table diagram showing sample contents of a travel choice table used by the facility in some embodiments to store information about travel choices.

FIG. 5 is a table diagram showing sample contents of a travel choice metadata table used by the facility in some embodiments to store metadata tags that correspond to particular travel choices.

FIG. 7 is a table diagram showing sample contents of a pictorial representation table used by the facility in some embodiments to store pictorial representations used by the facility FIG. 8 is a table diagram showing sample contents of a pictorial representation metadata table used by the facility in some embodiments to store metadata for pictorial representations used by the facility.

FIG. 10 is a table diagram showing sample contents of a user table used by the facility in some embodiments to store information about the users registered to use the facility.

FIG. 12 is a table diagram showing sample contents of a trip table used by the facility in some embodiments to store information about each trip being planned by the facility.

FIG. 13 is a table diagram showing sample contents of a participating user table used by the facility in some embodiments to store associations between a trip and the users participating in the trip.

FIG. 19 is a table diagram showing sample contents of a pictorial representation selection table.

FIG. 22 is a display diagram showing a sample display presented by the facility in some embodiments to permit the hierarchical selection of pictorial representations.

DETAILED DESCRIPTION

Figure 1:
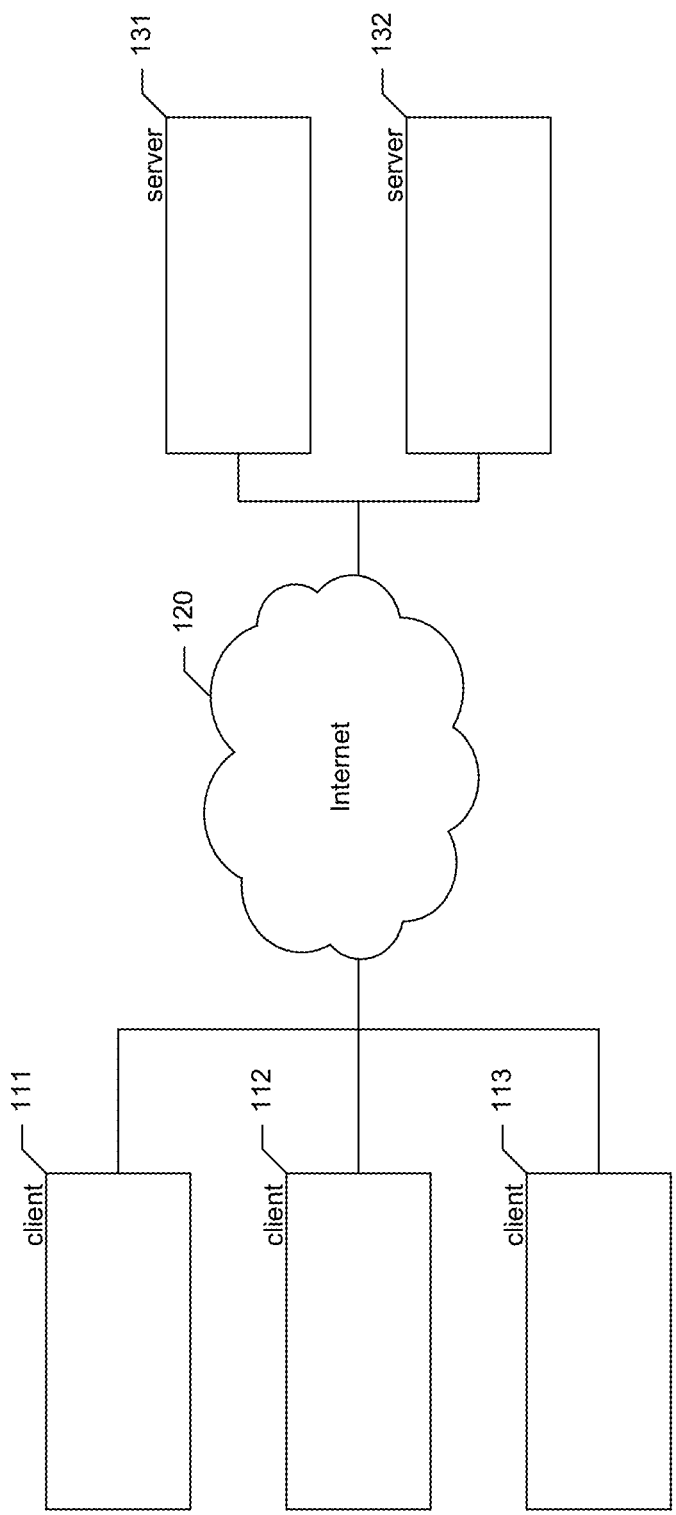
FIG. 1 is a network diagram showing an environment in which the facility operates in some embodiments.

The inventors have recognized that conventional approaches to enabling a prospective traveler to plan a trip have significant disadvantages. First, the inventors have noted that, for many prospective travelers, the burden of explicitly selecting a travel destination—as well as additional trip details such as selecting lodging, restaurant, and activity choices—can be significant. For example, a prospective traveler may prefer a certain type of setting for his or her trip, but may not be aware of destinations that match that setting type.

Further, the user interactions required by conventional systems can be difficult or unpleasant. For example, in many cases, a user must populate several textual fields of one or more forms, often necessitating the use of a computing device that has a large physical keyboard and/or a large display. Also, it is often true that this process must be completed in one or more long, contiguous sessions, making these efforts difficult for people to fit into their busy schedules.

Additionally, conventional systems provide few useful tools for enabling a travel planner to collaborate with other people who will participate in the trip about the trip's planning.

In response to recognizing these disadvantages of conventional travel planning systems, the inventors have conceived and reduced to practice a hardware and/or software facility for recommending and/or arranging travel plans in response to the selection of pictorial representations by one or more users ("the facility").

The facility includes a visual user interface that presents a series of photographs, illustrations, icons, animation sequences, video sequences, or other kinds of still or moving pictorial representations of aspects of travel. A user who wishes to go on a trip can select certain of these pictorial representations as a way of expressing interests that s/he would like to pursue as part of the trip.

For example, out of pictorial representations showing a cactus, a museum, a snowboarder, an eagle, a beach umbrella, a backpacker, and the stage of an outdoor music festival, the user may select a pictorial representation of a beach umbrella to express an interest in a beach setting. From pictorial representations showing a house, a hotel, an apartment, a beach cottage, and a tent, the user may select a pictorial representation of a house to express an interest in rental house housing choices. Among pictorial representations showing a surfer, a fishing boat, a kayaker, a sailboat, a beach ball, and a hammock, the user may select a pictorial representation of a sailboat to express an interest in a sailboat cruise activity. From pictorial representations showing a hot dog in a bun, a fish on a grill, a bowl of pasta, an ice cream sundae, a steak, and enchiladas, the user may select a pictorial representation of enchiladas to express an interest in Mexican food. In some embodiments, some of the pictorial representations presented by the facility include brands, such as airline, hotel, restaurant, etc. brands.

In response, the facility presents proposed travel choices determined on the basis of the selected pictorial representations. In some embodiments, the facility selects these proposed travel choices by collecting metadata tags attached to the selected pictorial representations to specify the travel interests they represent, then matching metadata tags in the set with those of travel choices, such as airline flights, ferry sailings train trips, hotel rooms, house rentals, restaurants, sailing cruises, ski area lift tickets and equipment rentals, etc. The user can either accept these proposed travel choices and proceed to reserve and/or purchase them, or decline them. Upon declining, the user can immediately obtain alternative sets of proposed travel details based on the same pictorial representation selections, or first revise these selections to obtain one or more sets of proposed travel details based on the revised selections.

In some embodiments, a user can review and select pictorial representations during a series of brief free moments in his or her day, across a variety of different devices, such as on his or her smartphone while on an elevator, on a tablet while waiting for an oven to preheat, or on their office computer while waiting for the starting time for a conference call to arrive.

In some embodiments, the facility provides a mechanism for curating the set of selected pictorial representations, such as by dragging a pictorial representation into a dock to select it, dragging a pictorial representation out of the dock to the selected, double-tapping or double-clicking on a selected pictorial representation to change its weight, etc.

In some embodiments, the facility allows the user who creates a trip to identify other users as participants (or "participating users") in the trip. This enables any of these identified participating users to make their own selections of pictorial representations. In some embodiments, the facility displays pictorial representations to all of the participating users for a trip in a way that indicates which of the participating users has selected each pictorial representation. In some embodiments, the facility provides notifications to the participating users for a trip when any participating user takes action, such as selecting or deselecting certain pictorial representations. In some embodiments, these selection indicators and/or notifications are triggered on the other contributing user's devices in real-time or near-real-time, such as within 30 seconds, within 10 seconds, within five seconds, or within one second. In some embodiments, the facility provides an explicit communication mechanism among the participating users for a trip, such as for communicating instant text messages, pictorial emojis, etc. among this group of users.

In a variety of embodiments, the facility uses one or more strategies for selecting pictorial representations to present to a user. In some embodiments, the facility presents pictorial representations that are responsive to previous selections by the user that, for example, provide an opportunity for the user to reinforce, contradict, or diversify the travel interests represented among the pictorial representations that the user has already selected. In some embodiments, the facility presents pictorial representations that are responsive to previous selections by the user to provide an opportunity for the user to narrow the travel interests represented among the pictorial representations that the user has already selected—for example, the user may narrow an interest in hotels to an interest in boutique hotels; narrow an interest in Mexican food to an interest in fancy Mexican food; etc. In some embodiments, the facility presents pictorial representations in one category of travel interests that correspond to the user's selection of pictorial representations in one or more other categories of travel interests—for example, in some embodiments, a user's selection of one or more pictorial representations conveying a mountain setting make it more likely that the facility will present pictorial representations conveying skiing and snowmobiling activities, and less likely that the facility will present pictorial representations conveying museum and beach activities. Conversely, in some embodiments, a user selection of one or more pictorial representations conveying the skiing activity make it more likely that the facility will present pictorial representations conveying the mountain setting, and less likely that the facility will present pictorial representations conveying beach, desert, and city settings.

In various embodiments, and on various client devices, the facility presents pictorial representations in different ways. In some embodiments, the facility presents one pictorial representation at a time. In some embodiments, the facility presents a number of pictorial representations of the time, in some cases an entire screenful. In some embodiments, the facility organizes the pictorial representations in a sequence. In some embodiments, the facility organizes the pictorial representations in a hierarchy, into which the user can drill down by making successively more detailed selections.

In some embodiments, the facility procures pictorial representations in a manner that is responsive to the metadata tags attached to travel choices, such as, for example:

using these metadata tags to automatically or manually search photo collections, such as stock photo collections; using these metadata tags to commission new or repurposed photos or drawings; etc. In some embodiments, the facility procures a large number of pictorial representations without regard for their subject matter—either already subject to metadata tags or adding metadata tags to them after procurement—and matches them to travel choices metadata tags as needed. In some embodiments, the facility invites its users to upload photos and other pictorial representations from trips planned by the facility, and associates these with some or all of the metadata tags used by the facility to plan each of these trips.

In some embodiments, the user creating the trip or other participating users can explicitly specify certain criteria for the trip, such as budget, date range, geographic region or radius, etc. In some embodiments, for each user, the facility explicitly collects or infers cross-trip travel preferences of the user, such as originating city, preferred airline, seat class, and seat location, preferred hotel brand, preferred hotel type, etc.

FIG. 1 is a network diagram showing an environment in which the facility operates in some embodiments. The network diagram shows clients 111-113 used by users. Each of the clients executes software, such as web browsers or specialized application programs, to communicate with one or more servers 131 and 132—such as servers in data centers—via the Internet 120 or one or more other networks. In some embodiments, the servers and/or data centers are distributed geographically to provide disaster and outage survivability, both in terms of data integrity and in terms of continuous availability. Distributing the data centers geographically also helps to minimize communications latency with clients in various geographic locations.

While various embodiments are described in terms of the environment described above, those skilled in the art will appreciate that the facility may be implemented in a variety of other environments including a single, monolithic computer system, as well as various other combinations of computer systems or similar devices connected in various ways. In various embodiments, a variety of computing systems or other different devices may be used as clients, including desktop computer systems, laptop computer systems, automobile computer systems, tablet computer systems, smart phones, smart watches and other wearable computing devices, personal digital assistants, televisions, cameras, etc.

Figure 2:
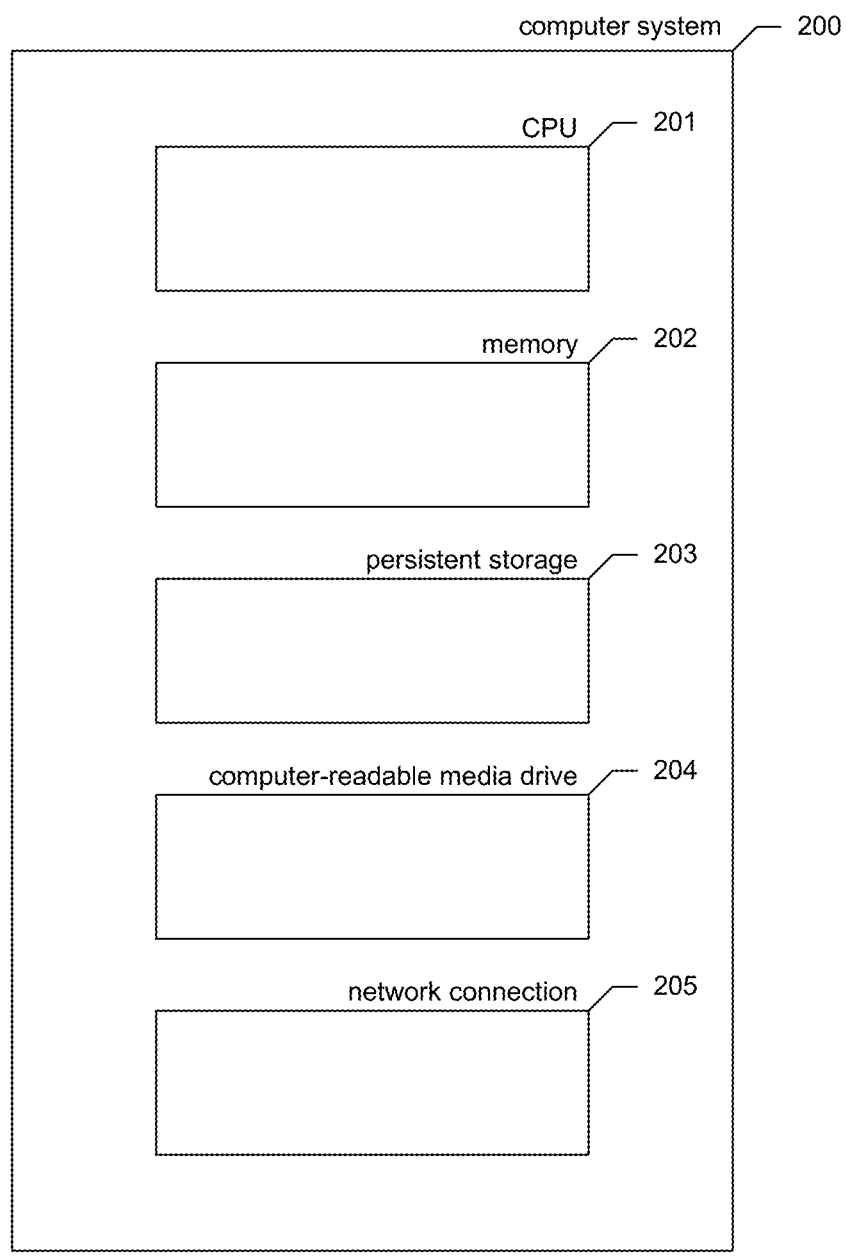
FIG. 2 is a block diagram showing some of the components typically incorporated in at least some of the computer systems and other devices on which the facility operates.

FIG. 2 is a block diagram showing some of the components typically incorporated in at least some of the computer systems and other devices on which the facility operates. In various embodiments, these computer systems and other devices 200 can include server computer systems, desktop computer systems, laptop computer systems, netbooks, tablets, mobile phones, personal digital assistants, televisions, cameras, automobile computers, electronic media players, smart watches and other wearable computing devices, etc. In various embodiments, the computer systems and devices include one or more of each of the following: a central processing unit ("CPU"), graphics processing unit ("GPU"), or other processor 201 for executing computer programs; a computer memory 202 for storing programs and data while they are being used, including the facility and associated data, an operating system including a kernel, and device drivers; a persistent storage device 203, such as a hard drive or flash drive for persistently storing programs and data; a computer-readable media drive 204, such as a floppy, CD-ROM, or DVD drive, for reading programs and data stored on a computer-readable medium; and a network connection 205 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components. In various embodiments, the computing system or other device also has some or all of the following hardware components: a display usable to present visual information to a user; one or more touchscreen sensors arranged with the display to detect a user's touch interactions with the display; a pointing device such as a mouse, trackpad, or trackball that can be used by a user to perform gestures and/or interactions with displayed visual content; an image sensor, light sensor, and/or proximity sensor that can be used to detect a user's gestures performed nearby the device; and a battery or other self-contained source of electrical energy that enables the device to operate while in motion, or while otherwise not connected to an external source of electrical energy.

Figure 3:
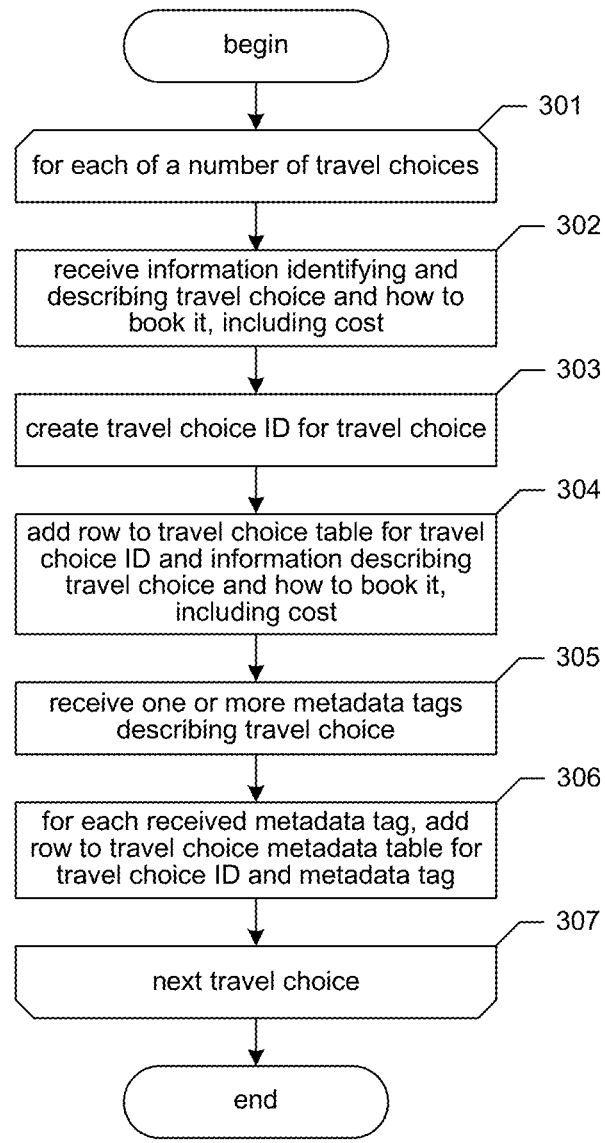
FIG. 3 is a flow diagram showing a process performed by the facility to populate the travel choices used by the facility.

FIG. 3 is a flow diagram showing a process performed by the facility to populate the travel choices used by the facility. In acts 301-307, the facility loops through each of a number of different travel choices. As mentioned above, travel choices can encompass virtually every type of selection made in connection with travel, such as particular flights or trains, hotel rooms, home rentals, vehicle rentals, guides or instructors, restaurants, activities, activity licenses, etc. In act 302, the facility receives information identifying and describing the travel choice and how to book it, including a cost associated with the travel choice. In act 303, the facility creates a travel choice ID to uniquely identify the travel choice among other travel choices used by the facility. In act 304, the facility adds a row to a travel choice table for the travel choice ID created in act 303 and information describing the travel choice and how to book it including cost, received in act 302.

FIG. 4 is a table diagram showing sample contents of a travel choice table used by the facility in some embodiments to store information about travel choices. The travel choice table 400 is made up of rows, such as rows 411-416, each corresponding to a single travel choice and divided into the following columns: a travel choice ID column 401 containing the travel choice ID assigned to the travel choice by the facility in act 303; a travel choice description field 402 containing text or other content describing the travel choice; a travel choice cost column 403 containing information about the cost of the travel choice; and a travel choice booking information column 404 containing information usable by the facility to book the travel choice on behalf of one or more users, either automatically or manually. For example, row 411 indicates that a travel choice having travel choice ID 1145 has the description "Mexi Maxi," a cost of $40 per person, and can be booked by calling the telephone number 786-111-3241.

While FIG. 4 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; may contain a much larger number of rows than shown; may be the subject of one or more indices; etc.

Returning to FIG. 3, in act 305, the facility receives one or more metadata tags describing the travel choice. For example, the metadata tags may have been attributed to the travel choice at a time before the travel choice information was received in step 302, or these metadata tags may have been assigned to the travel choice subsequently by the facility, such as automatically using automatic natural language understanding and/or automatic image recognition; manually using human editors, commentators, or microtaskers; etc. For example, for the travel choice having travel choice ID 1145 shown in row 411 of travel choice table 400 shown in FIG. 4, the facility may receive the following two metadata tags: food:mexican and food:mexican-fancy. In act 306, for each metadata tag received in act 305, the facility adds a row to a travel choice metadata table for the travel choice ID created in act 303 and the metadata tag.

FIG. 5 is a table diagram showing sample contents of a travel choice metadata table used by the facility in some embodiments to store metadata tags that correspond to particular travel choices. The travel choice metadata table 500 is made up of rows, such as rows 511-523, each corresponding to a single combination of a travel choice with the metadata tag, and divided into the following columns: a travel choice ID column 501 containing the travel choice ID assigned to the travel choice to which a metadata tag corresponds, and a metadata tag column 502 containing the corresponding metadata tag. For example, it can be seen in rows 511-512 that the travel choice in row 411 of travel choice table 400 shown in FIG. 4 is associated with two metadata tags: food:mexican and food:mexican-fancy.

Returning to FIG. 3, in act 307, if additional travel choices remain, then the facility continues in act 301 to process the next travel choice, else this process concludes.

Those skilled in the art will appreciate that the acts shown in FIG. 3 and in each of the flow diagrams discussed below may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

Figure 6:
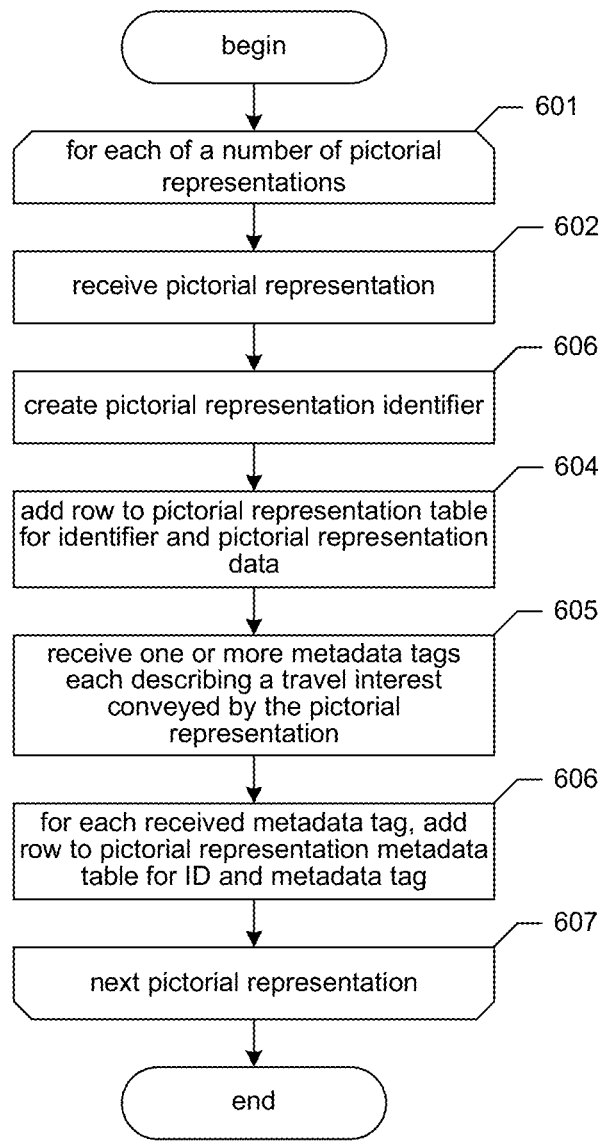
FIG. 6 is a flow diagram showing a process performed by the facility in some embodiments to populate the pictorial representations used by the facility.

FIG. 6 is a flow diagram showing a process performed by the facility in some embodiments to populate the pictorial representations used by the facility. In acts 601-607, the facility loops through a number of pictorial representations. In act 602, the facility receives the pictorial representation. As noted above, in some embodiments, the facility receives the pictorial representation in act 602 in response to seeking one or more pictorial representations that embody each of the metadata tags received in connection with one or more travel choices in act 306 shown in FIG. 3. In some embodiments, the facility receives pictorial representations in act 602 without regard for whether they embody any of these metadata tags.

In act 606, the facility creates an identifier uniquely identifying the pictorial representation received in act 602 among all of the pictorial representations received. In act 604, the facility adds a row to a pictorial representation table for the identifier created in acts 606 and the data making up the pictorial representation received in act 602.

FIG. 7 is a table diagram showing sample contents of a pictorial representation table used by the facility in some embodiments to store pictorial representations used by the facility. The pictorial representation table 700 is made up of rows, such as rows 711-727, each corresponding to a different pictorial representation and divided into the following columns: a pictorial representation ID column 701 containing an ID assigned to the pictorial representation, and a pictorial representation data column 702 storing the data making up the pictorial representation. For example, row 711 contains the data making up the pictorial representation having pictorial representation ID 146.

Returning to FIG. 6, in act 605, the facility receives one or more metadata tags each describing a travel interest conveyed by the pictorial representation. For example, the metadata tags may have been attributed to the pictorial representation at a time before the pictorial representation was received in step 602, or these metadata tags may have been assigned to the pictorial representation subsequently by the facility, such as automatically using automatic image recognition; manually using human editors, commentators, or microtaskers; etc. In act 606, for each metadata tag received in act 605, the facility adds a row to a pictorial representation metadata table for the pictorial representation ID created in act 606 and the metadata tag.

FIG. 8 is a table diagram showing sample contents of a pictorial representation metadata table used by the facility in some embodiments to store metadata for pictorial representations used by the facility. The pictorial representation metadata table 800 is made up of rows such as rows 811-829, each corresponding to a different combination of a pictorial representation and a metadata tag, and divided into the following columns: a pictorial representation ID column 801 containing the pictorial representation ID of a particular pictorial representation, and a metadata tag column 802 containing a metadata tag received for that pictorial representation. For example, rows 819-820 indicate that the pictorial representation having pictorial representation ID 160 is associated with two tags: activity:snowmobiling and setting:wintery.

Returning to FIG. 6, in act 607, if additional pictorial representations remain to be processed, then the facility continues in act 601 to process the next pictorial representation, else this process concludes.

Figure 9:
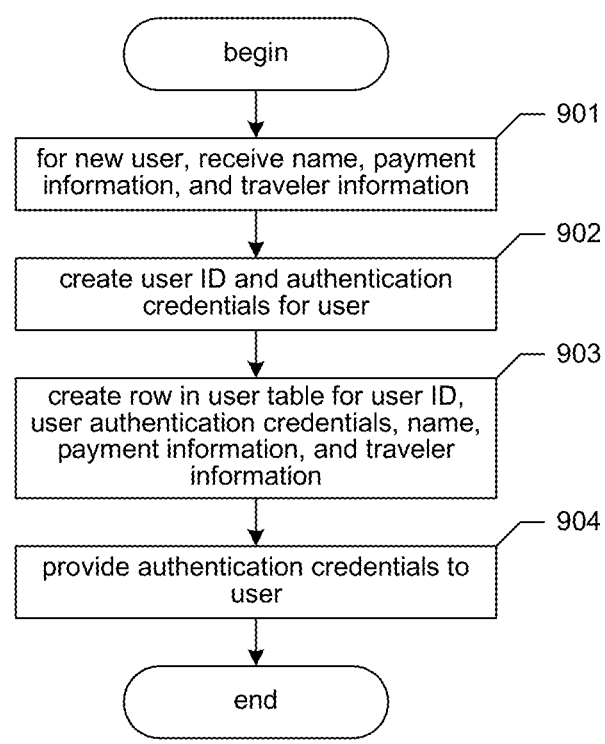
FIG. 9 is a flow diagram showing a process performed by the facility in some embodiments to register a new user of the facility.

FIG. 9 is a flow diagram showing a process performed by the facility in some embodiments to register a new user of the facility. In act 901, the facility receives for the new user the user's name, payment information, and traveler information. In some embodiments, the facility receives this information directly from the user, such as by displaying a form containing fields for this information into which the user enters the information, or using the user's permission to retrieve this information from another source where it is already stored. In act 902, the facility creates a user ID to identify this user and authentication credentials that this user can provide the facility in the future to authenticate his or her identity to the facility. These authentication credentials may be, in various embodiments, a password, a digital certificate, a private key, a rotating code, a shared secret, etc. In act 903, the facility creates a row in a user table to contain the user ID created in act 902, as well as the user authentication credentials, name, payment information, and traveler information received in act 901.

FIG. 10 is a table diagram showing sample contents of a user table used by the facility in some embodiments to store information about the users registered to use the facility. The user table 1000 is made up of rows, such as rows 1011-1015, each corresponding to a different user registered to use the facility. Each row is divided into the following columns: a user ID column 1001 containing a user ID identifying the user; an authentication credentials column 1002 containing authentication credentials to be provided or otherwise used by the user to authenticate himself or herself to the facility;

a name column 1003 containing a name for the user; a payment information column 1004 containing information that can be used to charge the user for trips and constituent travel choices proposed to the user and accepted by the user; and a traveler information column 1005 containing information used to book travel choices for the user, such as passport number, known traveler number, frequent flyer program membership, plane seating preferences, etc. For example, row 1011 indicates that the user having user ID 11111 and the name Jill Henry has provided as payment information a credit card having number 0987 3147 7653 1783 and a passport number of 7438930392.

Returning to FIG. 9, in act 904, the facility provides the authentication credentials created in act 902 to the user. In some embodiments (not shown), rather than the facility creating these user authentication credentials and providing them to the user or a credential repository operated for the user, the user creates these and provides them to the facility. After act 904, this process concludes.

Figure 11:
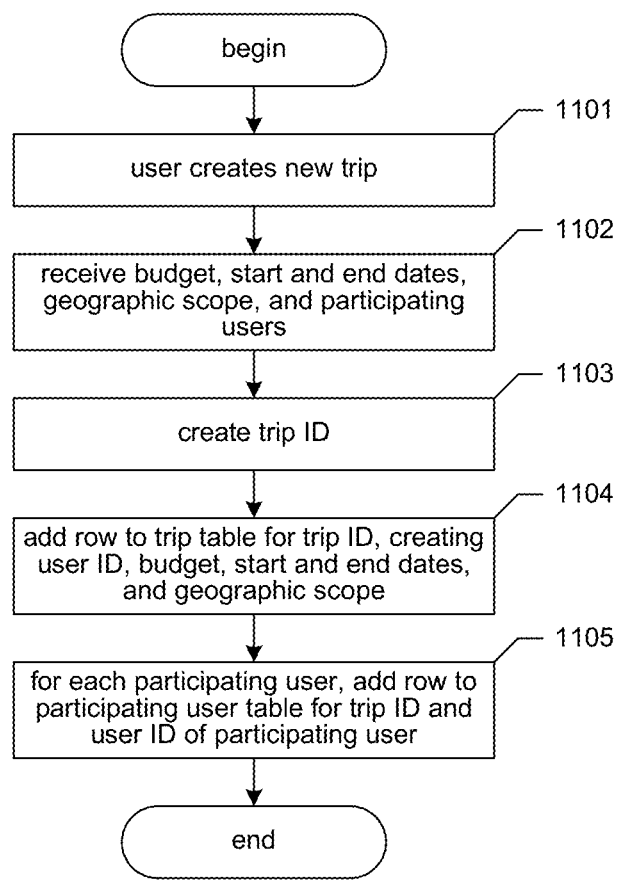
FIG. 11 is a flow diagram showing a process performed by the facility in some embodiments to create a new trip to be planned using the facility.

FIG. 11 is a flow diagram showing a process performed by the facility in some embodiments to create a new trip to be planned using the facility. In act 1101, a user creates a new trip, such as by pressing a new trip button displayed by the facility, speaking a voice command indicating that the user wants to create a new trip, etc. In act 1102, the facility receives information about the new trip, such as its budget, start and end dates, geographic scope for the trip, and information identifying any other users who are participating in the trip and should be permitted to interact with the facility as part of planning the trip. In act 1103, the facility creates a trip ID to uniquely identify the trip among all the trips being planned by the facility. In act 1104, the facility adds a row to a trip table for the trip ID created in act 1103, together with the user ID that identifies the creating user, and the budget, start and end dates, and geographic scope received in act 1102.

FIG. 12 is a table diagram showing sample contents of a trip table used by the facility in some embodiments to store information about each trip being planned by the facility. The trip table 1200 is made up of rows, such as rows 1211-1212, each corresponding to a different trip being planned using the facility. Each row is divided into the following columns: a trip ID column 1201 containing a trip ID identifying the trip; a creating user ID column 1202 containing the user ID of the user who created the trip; a budget column 1203 containing a budget specified for the trip by the creating user; start and end date columns 1204 and 1205 containing the first and last dates that the creating user specified for the trip; and a geographic scope column 1206 containing information about the range of geographic locations that are candidates for the trip. For example, the contents of row 1212 indicate that the trip that has trip ID 403243 was created by the user having user ID 22222 and has a budget of $12,500, start and end dates of June 1 and Jun. 10, 2018, respectively, and a geographic scope that extends to any location within 1500 miles of the zip code 97131.

Returning to FIG. 11, in act 1105, for each participating user identified by the creating user in act 1102, the facility adds a row to a participating user table containing the trip ID created in act 1103, together with the user ID of the participating user.

FIG. 13 is a table diagram showing sample contents of a participating user table used by the facility in some embodiments to store associations between a trip and the users participating in the trip. The participating user table 1300 is made up of rows, such as rows 1311-1315, each corresponding to a particular combination of a trip and a user who is participating in the trip. Each row is divided into the following columns: a trip ID column 1301 containing the trip ID that identifies the trip; and a participating user ID column 1302 containing the user ID identifying the participating user. For example, rows 1311-1314 show users having the following user IDs have been identified as participating users for the trip having trip ID 342512: 11111, 33333, 44444, and 55555.

Returning to FIG. 11, after act 1103, this process concludes.

Figure 14:
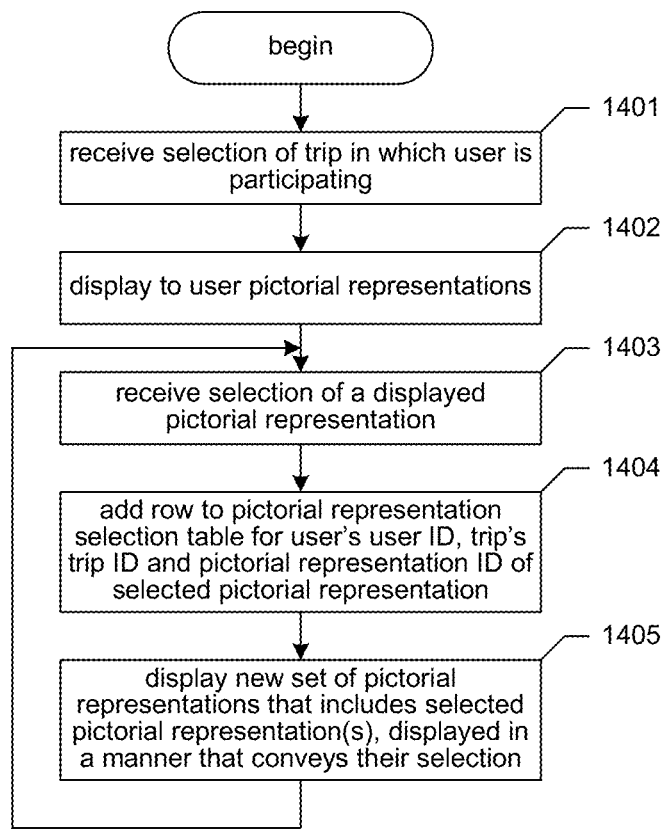
FIG. 14 is a flow diagram showing a process performed by the facility in some embodiments to allow a particular user to select pictorial representations representing interests that the user would like to pursue as part of a particular trip being planned using the facility.

FIG. 14 is a flow diagram showing a process performed by the facility in some embodiments to allow a particular user to select pictorial representations representing interests that the user would like to pursue as part of a particular trip being planned using the facility. In act 1401, the facility receives the selection of a trip in which the user is participating. In some embodiments, in response to a command from the user to select a trip for which to select pictorial representations, the facility displays a list of trips in which the user is participating, and the user selects one, such as by touching information about the trip displayed on the screen, speaking information about the trip, etc. In some embodiments, if the user is participating in only a single trip, this trip is implicitly selected without any additional user input. In some embodiments, if the user issues such a command at a time when they are not participating in any trips, the facility interprets the command as a command to create a new trip.

In act 1402, the facility displays to the user one or more pictorial representations.

Figure 15:
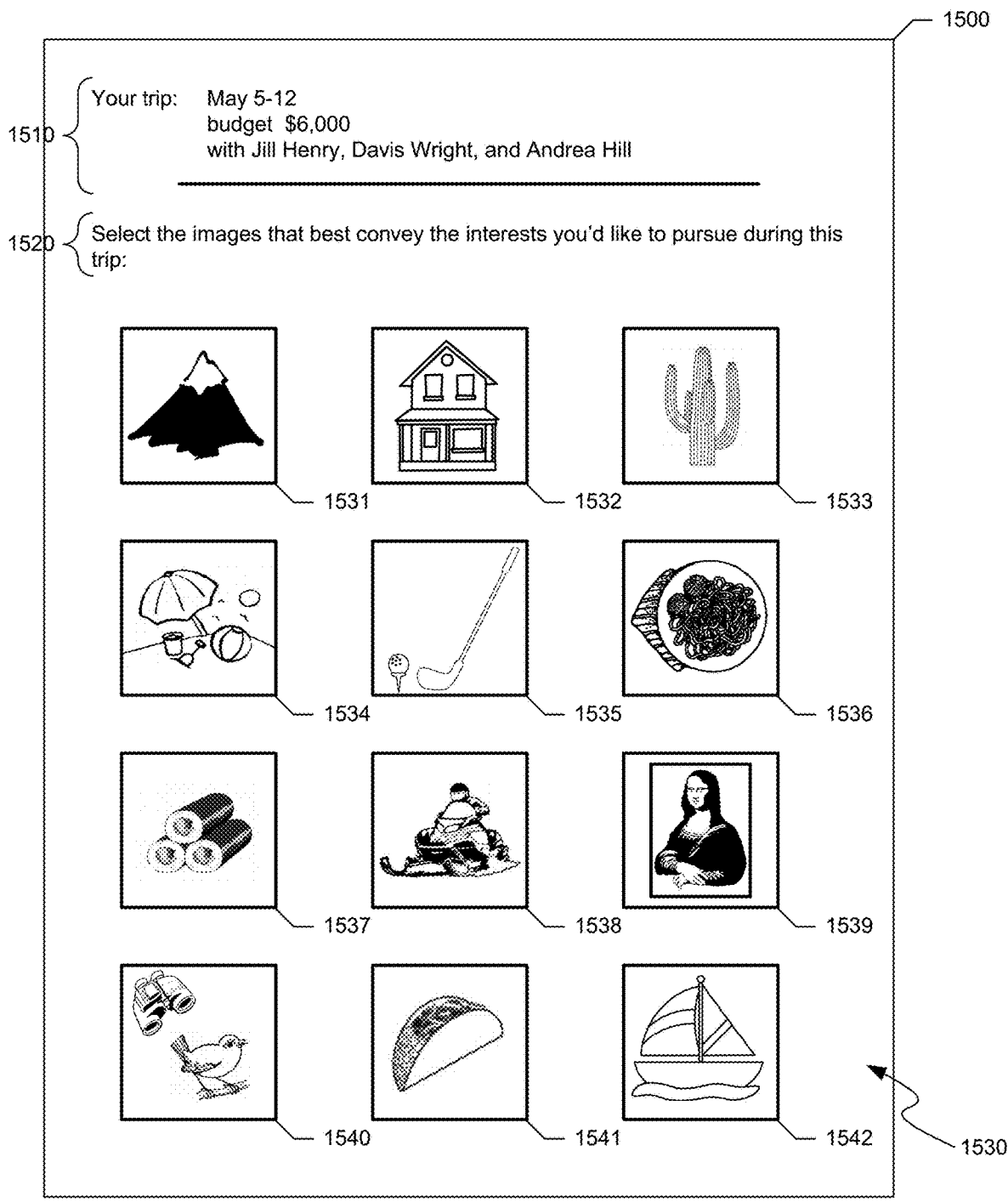
FIG. 15 is a display diagram showing a sample display presented by the facility in some embodiments to display pictorial representations to a user for a particular trip.

FIG. 15 is a display diagram showing a sample display presented by the facility in some embodiments to display pictorial representations to a user for a particular trip. The display 1500 includes information 1510 identifying the trip, including such information as dates, budget, and other participating users. The display also includes instructions to the user 1520 to select the pictorial representations that best convey interests that the user would like to pursue during the trip. The pictorial representations in 1530 initially displayed by the facility are the following: pictorial representation 1531 has pictorial representation ID 146, shows a mountain, and has the metadata tag setting:mountain, and thus represents the interest of a mountain setting; pictorial representation 1532 has pictorial representation ID 148, shows a house, and has the metadata tag lodging:house, and thus represents the interest of a house lodging; pictorial representation 1533 has pictorial representation ID 150, shows a cactus, and has the metadata tag setting:desert, and thus represents the interest of a desert setting; pictorial representation 1534 has pictorial representation ID 152, shows a beach, and has the metadata tag setting:beach, and thus represents the interest of a beach setting; pictorial representation 1535 has pictorial representation ID 154, shows a golf club and ball, and has the metadata tag activity:golf, and thus represents the interest of a golf activity; pictorial representation 1536 has pictorial representation ID 156, shows a plate of spaghetti and meatballs, and has the metadata tag food:italian, and thus represents the interest of a spaghetti meal; pictorial representation 1537 has pictorial representation ID 158, shows sushi rolls, and has the metadata tags food:japanese and food:japanese-sushi, and thus represents the interests of a Japanese meal and a Japanese sushi meal; pictorial representation 1538 has pictorial representation ID 160, shows a snowmobile, and has the metadata tags activity:snowmobiling and setting:wintery, and thus represents the interests of a wintery setting and a snowmobiling activity;

pictorial representation 1539 has pictorial representation ID 162, shows a painting, and has the metadata tag activity: museum-art, and thus represents the interest of an art museum activity; pictorial representation 1540 has pictorial representation ID 164, shows a bird and binoculars, and has the metadata tag activity:birdwatching, and thus represents the interest of a birdwatching activity; pictorial representation 1541 has pictorial representation ID 166, shows a taco, and has the metadata tag food:mexican, and thus represents the interest of a Mexican meal; and pictorial representation 1542 has pictorial representation ID 168, shows a sailboat, and has the metadata tag activity:sailingtour, and thus represents the interest of a sailing tour activity.

Returning to FIG. 14, in act 1403, the facility receives a selection of a displayed pictorial representation. In various embodiments, the user can perform the selection by tapping or clicking on the pictorial representation to be selected; speaking one or more words associated with the pictorial representation; swiping the pictorial representation in a certain direction; etc. In some cases, the user's selection of the pictorial representation connotes a weight assigned to the user's selection of the pictorial representation, such as by touching or clicking more times or for a longer period of time in order to attribute a heavier weight to the travel interests represented by the pictorial representation. In act 1404, the facility adds a row to a pictorial representation selection table containing the user's user ID, the trip ID of the trip selected in act 1401, and the pictorial representation ID of the pictorial representation selected by the user. Act 1404 is described further below in connection with FIG. 19. In act 1405, the facility displays a (possibly) new set of pictorial representations that includes any pictorial representations that have been selected displayed in a manner that conveys their selection. In various embodiments the facility displays the selected pictorial representations with different-colored borders, different-patterned borders, user face photos or other avatars for the users, etc. to convey the identity/identities of the users who selected each pictorial representation. After act 1405, the facility continues in act 1403 to allow the user to select additional pictorial representations from those displayed.

Figure 16:
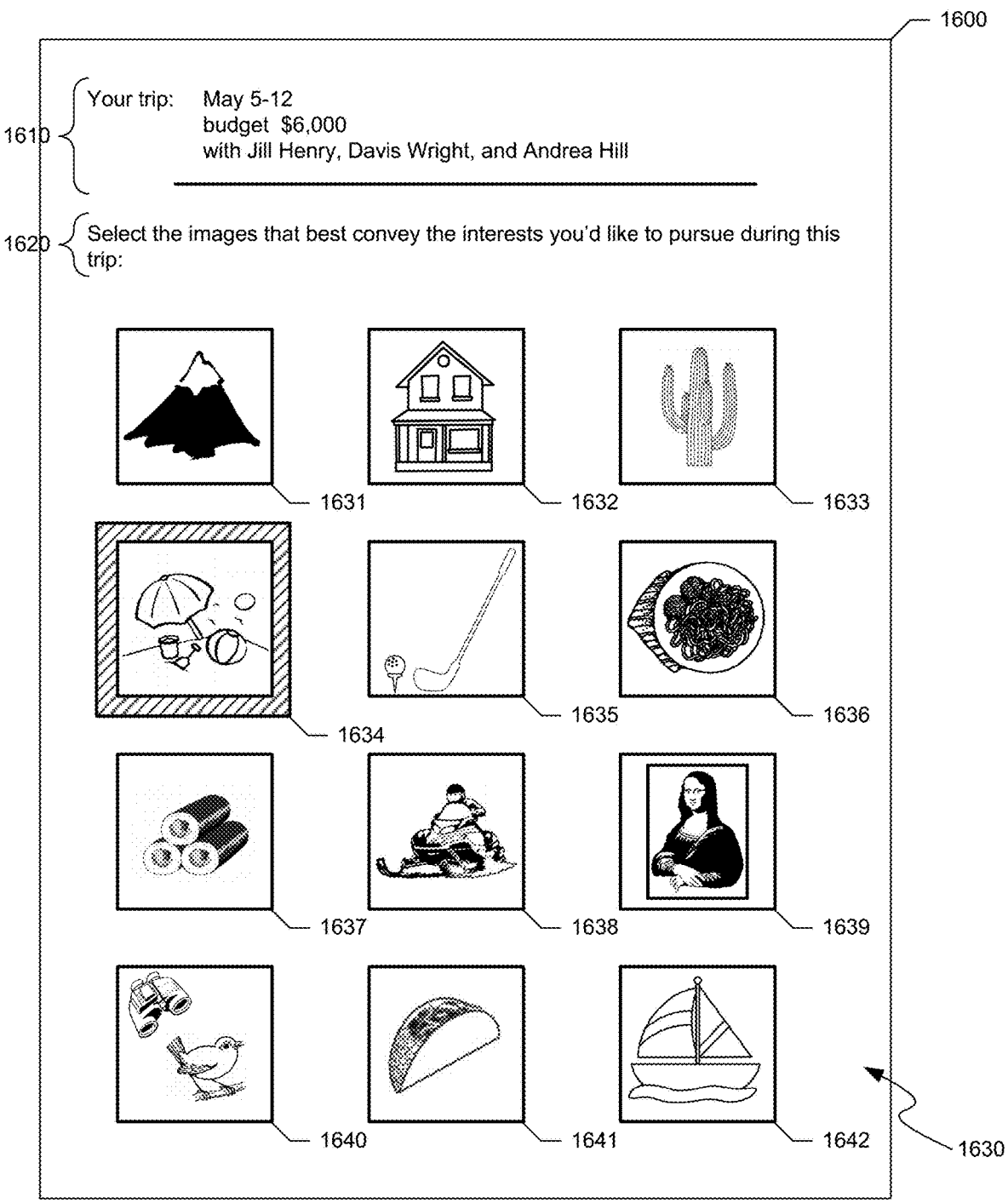
FIG. 16 is a display diagram showing the display presented by the facility to allow a user to select pictorial representations in a second state.

FIG. 16 is a display diagram showing the display presented by the facility to allow a user to select pictorial representations in a second state. By comparing display 1600 shown in FIG. 16 to display 1500 shown in FIG. 15, it can be seen that the facility has applied a border of a first type around the outside of pictorial representation 1634, indicating its selection by the user to whom the display is presented. While the set of pictorial representations shown could have been updated or otherwise altered in response to the user's selection, as shown in FIG. 16, the facility has not here done so.

Figure 17:
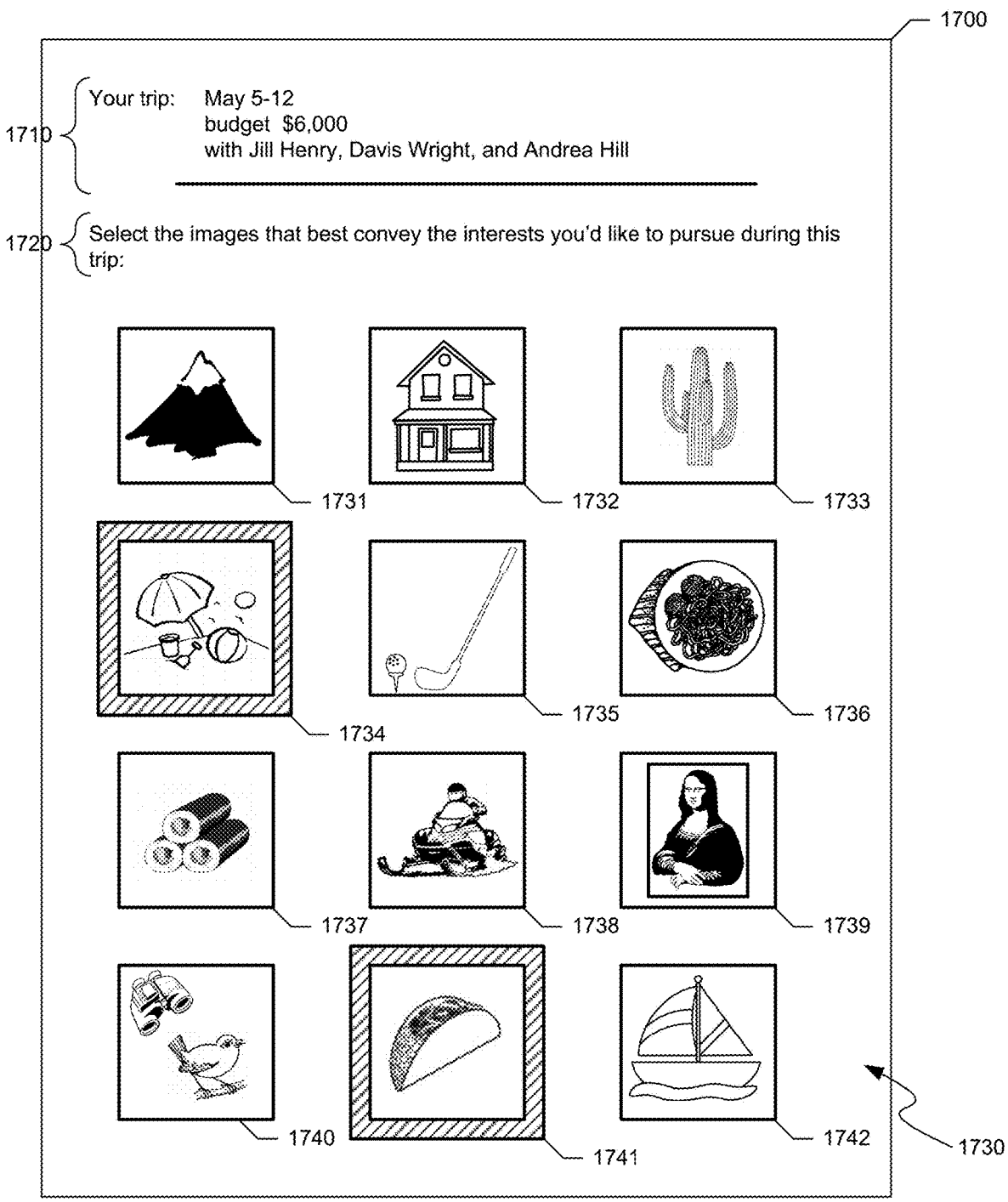
FIG. 17 is a display diagram showing the display presented by the facility to enable the user to select pictorial representations in a third state.

FIG. 17 is a display diagram showing the display presented by the facility to enable the user to select pictorial representations in a third state. It can be seen by comparing display 1700 shown in FIG. 17 to display 1600 shown in FIG. 16 that this user has additionally selected pictorial representation 1741, to which the facility has also applied the border of the first type to indicate selection of that pictorial representation by this user.

Where a trip has multiple participating users, any of these users may select pictorial representations. In some embodiments, pictorial representations that have been selected by one or more other participating users may be displayed to the remaining participating users.

Figure 18:
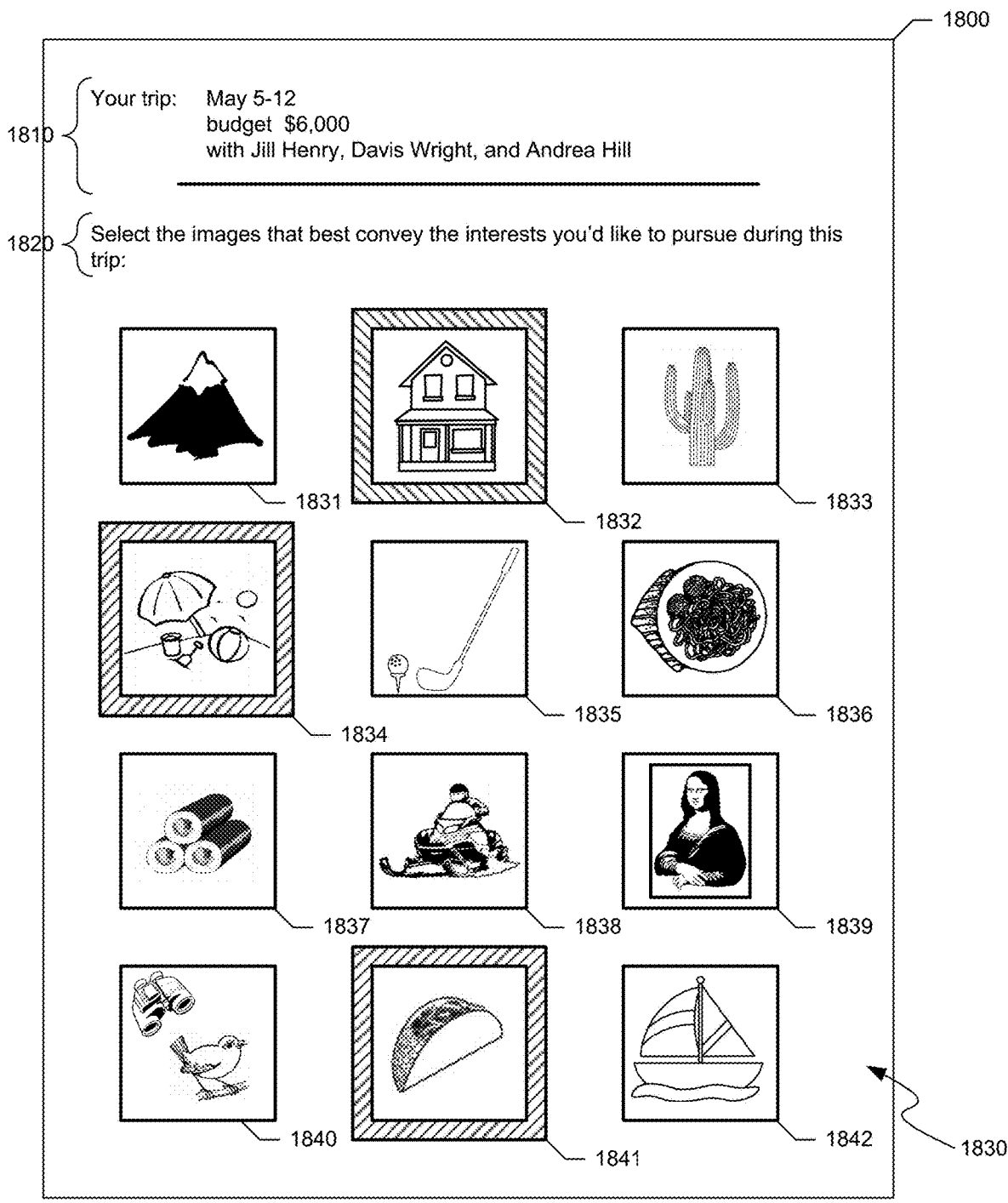
FIG. 18 is a display diagram showing the display presented by the facility to permit a user to select pictorial representations in a fourth state

FIG. 18 is a display diagram showing the display presented by the facility to permit a user to select pictorial representations in a fourth state. By comparing display 1800 shown in FIG. 18 to display 1700 shown in FIG. 17, it can be seen that a different participating user has selected pictorial representation 1832, to which the facility has applied a border of a second type that distinguishes pictorial representation 1832, selected by a different user, from pictorial representations 1834 and 1841, selected by this user.

FIG. 19 is a table diagram showing sample contents of a pictorial representation selection table. The pictorial representation selection table 1900 is populated in accordance with act 1404 shown in FIG. 14. The pictorial representation selection table is made up of rows, such as rows 1911-1913. Each row corresponds to the selection of a particular pictorial representation by a particular user for a particular trip, and is divided into the following columns. A trip ID column 1901 containing the trip ID identifying the trip; a user ID of selecting user column 1902 containing the user ID identifying the participating user who selected the pictorial representation for the trip; and a pictorial representation ID of selected pictorial representation column 1903 containing the pictorial representation ID identifying the pictorial representation selected by this user for this trip. It can be seen from rows 1911-1913 that, for the trip having trip ID 342512, a first user having user ID 11111 has selected a pictorial representation having pictorial representation ID 152 (pictorial representation 1832 shown in FIG. 18), and a second user having the user ID 33333 has selected the pictorial representations having pictorial representation IDs 148 and 166 (pictorial representations 1834 and 1841 shown in FIG. 18).

Any of the participating users can continue to view and select pictorial representations for the trip during a period of time, such as until a trip planning end date specified by the creating user, until the creating user specifies a plan trip command, etc. In some embodiments, the creating user of a trip or any of the participating users of the trip can curate the pictorial representations selected for the trip, either only their own pictorial representation selections or those made by any of the participating users.

Figure 20:
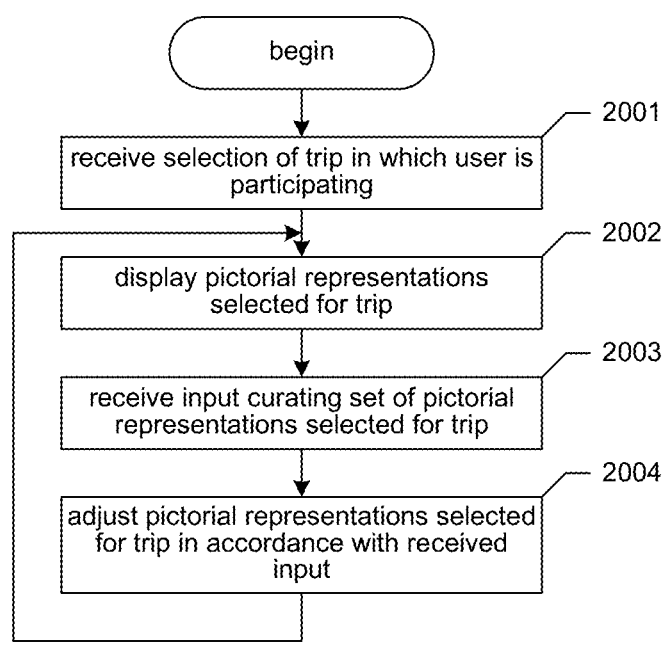
FIG. 20 is a flow diagram showing a process performed by the facility in some embodiments to enable a user to curate selected pictorial representations.

FIG. 20 is a flow diagram showing a process performed by the facility in some embodiments to enable a user to curate selected pictorial representations. In act 2001, the facility receives the selection of a trip in which the user is participating, or selection of a trip for which the user is the creating user. In act 2002, the facility displays pictorial representations selected for the trip selected in act 2001.

Figure 21:
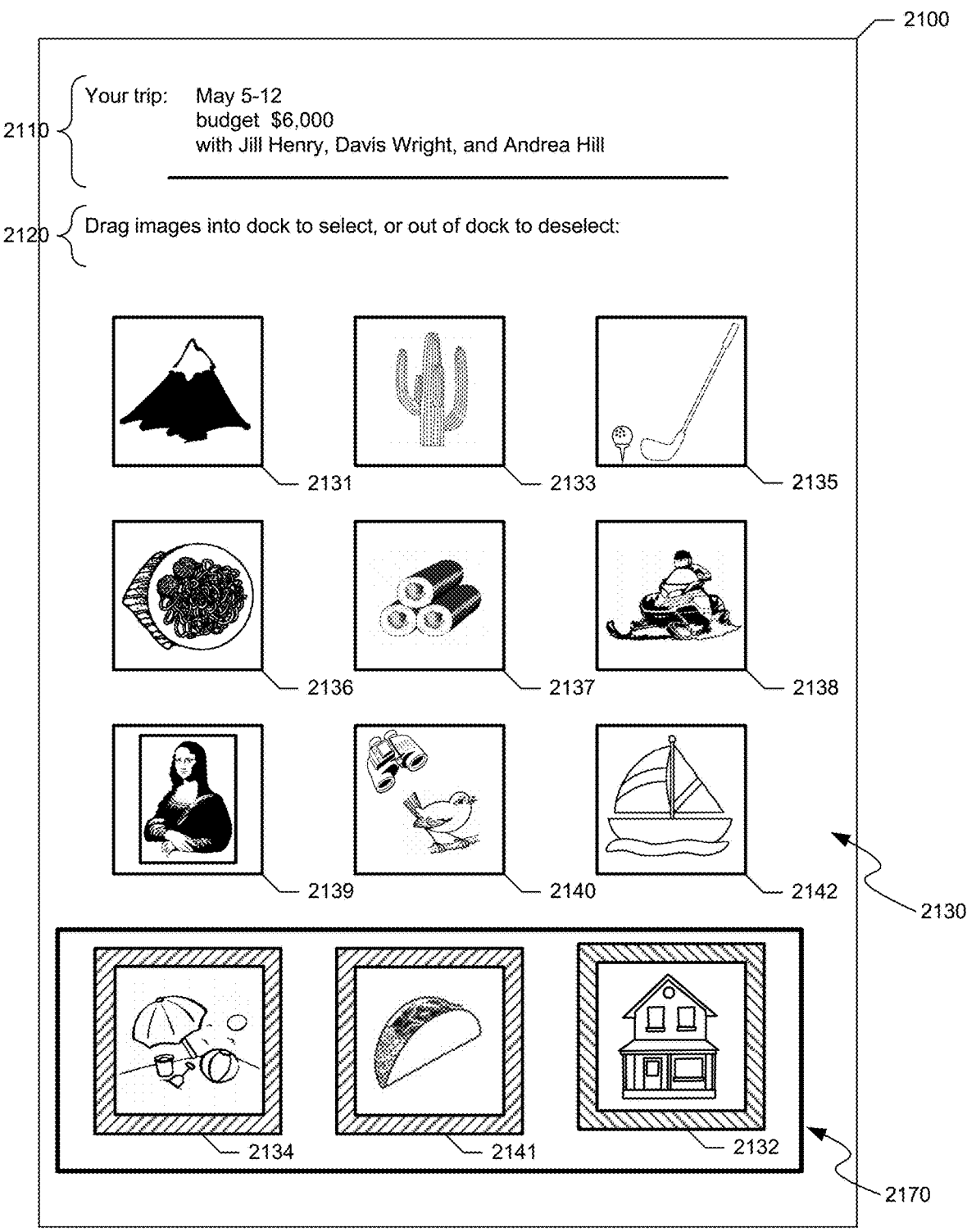
FIG. 21 is a display diagram showing a display presented by the facility in some embodiments to display the pictorial representations selected for a trip for the purpose of curating them.

FIG. 21 is a display diagram showing a display presented by the facility in some embodiments to display the pictorial representations selected for a trip for the purpose of curating them. The display 2100 includes information 2110 identifying the trip, and an instruction 2120 that pictorial representations can be dragged into a dock 2170 to select them, or out of this dock to deselect them. As one example, to express an interest in sushi rather than mexican food, the user could drag selected pictorial representation 2141 out of the dock into area 2130, and drag pictorial representation 2137 from area 2130 into the dock. In various embodiments, the user can use this and/or other user interfaces to perform other curating actions, such as changing one or more weights attributed to selected pictorial representations (not shown).

Returning to FIG. 20, in act 2003, the facility receives user input curating the set of pictorial representations selected for the trip displayed in act 2002. In act 2004, the facility adjusts the pictorial representations selected for the trip in accordance with the input received in act 2003. After act 2004, the facility continues in act 2002 to redisplay the pictorial representations selected for the trip.

Figure 22:
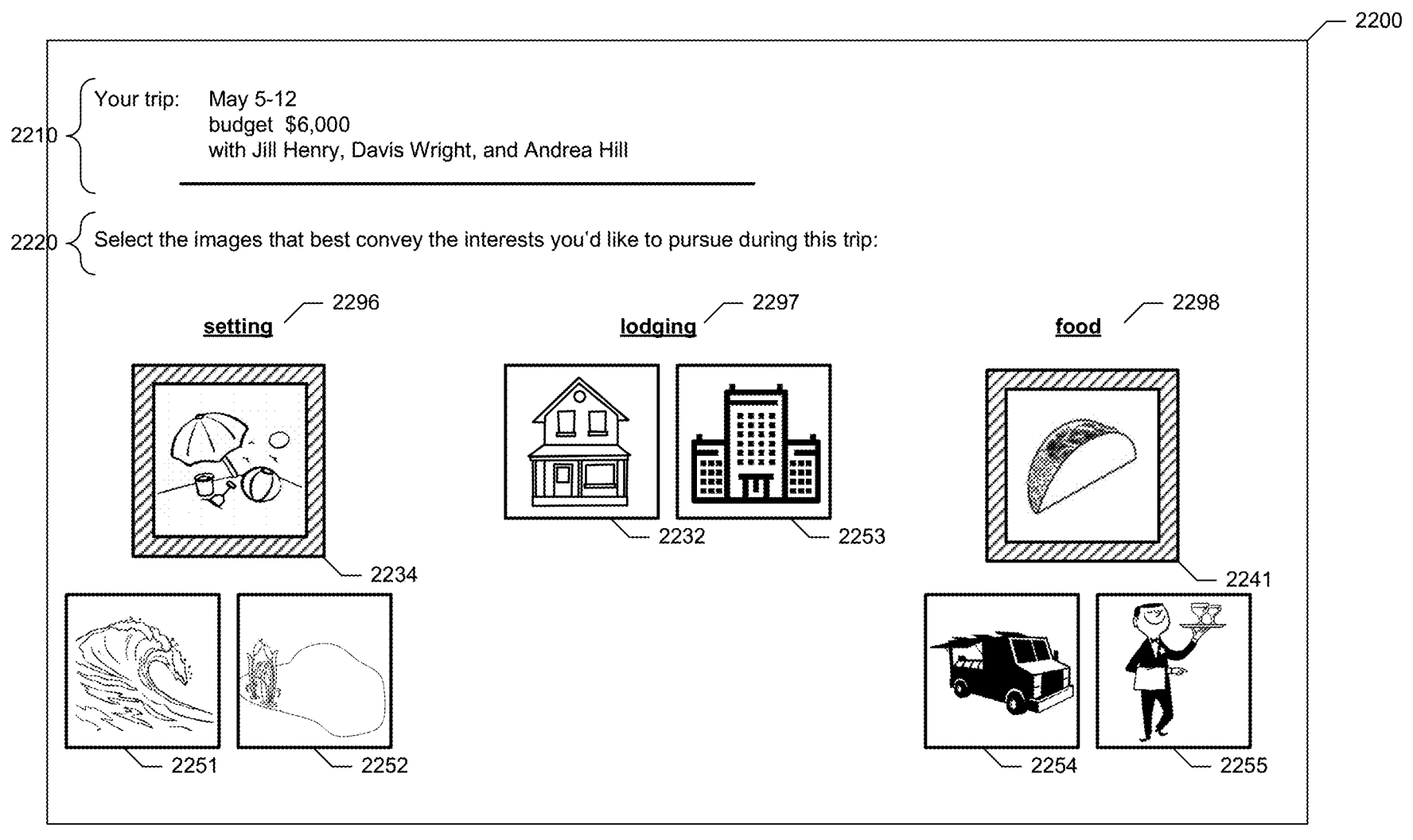

FIG. 22 is a display diagram showing a sample display presented by the facility in some embodiments to permit the hierarchical selection of pictorial representations. The display 2200 has information 2210 identifying the trip, as well as instructions 2220 to select the pictorial representations that best convey the interests that this user would like to pursue during the trip. In the display, pictorial representations are displayed under headings each corresponding to a top level metadata tag identifying a travel interest conveyed by one or more pictorial representations: a setting heading 2296, a lodging heading 2297, and a food heading 2298. Under the lodging heading for the lodging top-level metadata tag are two unselected pictorial representations: pictorial representation 2232 representing the lodging:house metadata tag, and pictorial representation 2253 representing the lodging:hotel metadata tag. Were the user to select pictorial representation 2253 for the lodging:hotel metadata tag, the facility would add a border to pictorial representation 2253 indicating its selection, and display beneath it one or more additional pictorial representations corresponding to more detailed metadata tags that are descendents of the lodging:hotel metadata tag in the metadata hierarchy, such as lodging:hotel-boutique and lodging:hotel-corporate. The facility has already responded to the selection of pictorial representation 2234 under the setting heading and pictorial representation 2241 under the food heading in this way. Under the setting heading, the user's selection of pictorial representation 2234 representing the setting:beach setting, the facility has displayed unselected pictorial representations 2251 and 2252, representing the setting:beach-ocean and setting:beach-lake metadata tags. The user can proceed to select one of these, in response to which the facility may display additional pictorial representations corresponding to tags that are further descendents in the metadata hierarchy. In some embodiments (not shown), the facility performs a similar kind of hierarchical prompting to descend subtrees of the metadata hierarchy without explicitly organizing the user interface in accordance with these hierarchical descents, such as organizing the pictorial representations in a stream or grid.

After the participating user has had an opportunity to select and/or curate pictorial representations for the trip, the creating user or a delegate of the creating user can use the facility to complete the planning of a trip, such as by issuing a command to complete the planning of the trip by, for example, tapping or clicking on a button or other control, or speaking a voice command to this effect.

Figure 23:
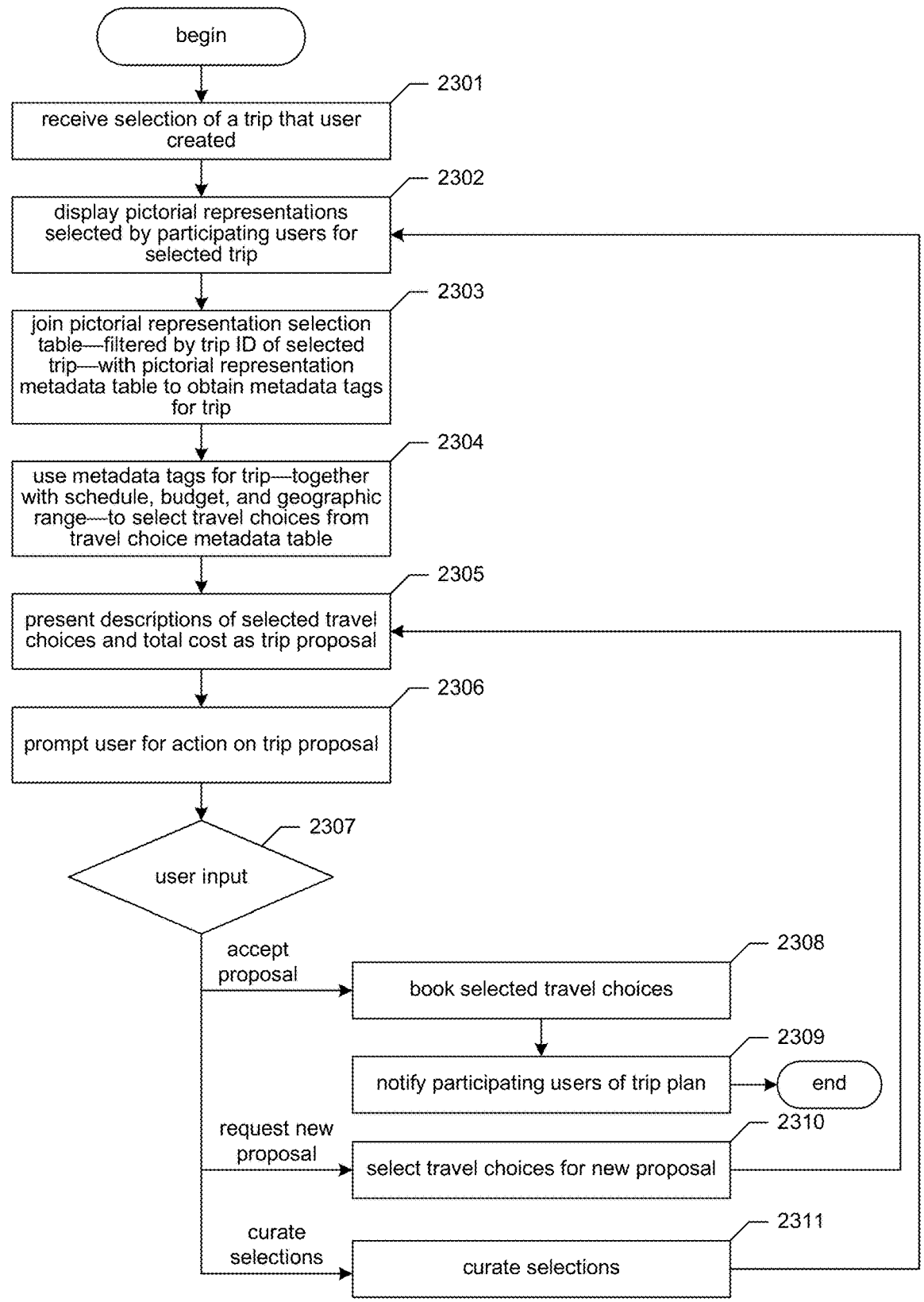
FIG. 23 is a flow diagram showing a process performed by the facility in some embodiments to recommend and book a trip proposal on the basis of the pictorial representations selected for the trip by the participating users.

FIG. 23 is a flow diagram showing a process performed by the facility in some embodiments to recommend and book a trip proposal on the basis of the pictorial representations selected for the trip by the participating users. In act 2301, the facility receives input selecting one of the trips that the present user has created to complete its planning, such as by choosing information describing this trip from a list of trips that the user has created. In act 2302, the facility displays the pictorial representations selected by the participating users for the trip selected in act 2301. In various embodiments, these pictorial representations are displayed in various ways. In some embodiments, the pictorial representations are displayed in a way that identifies each of the users who selected the pictorial representations, such as by applying differing borders for each user, displaying a face image or other avatar of such users, displaying the selecting users' names in connection with the pictorial representations, etc. In some embodiments, the display of the selected pictorial representations reflects differential weights attributed to the selected pictorial representations, such as weights reflecting the number of users who selected each pictorial representation, a total amount of weight explicitly accorded to each pictorial representation by each user, weights that reflect per-user user influence weights assigned by the creating user, etc. These differing weights can be indicated in a variety of ways, such as by sizing the selected pictorial representations at a magnification level corresponding to the weight; displaying a number corresponding to the weight in connection with each pictorial representation, displaying a chart or graph in connection with each pictorial representation that visually indicates its weight, etc. In act 2303, the facility obtains a set of metadata tags for the trip based on the metadata tags assigned to the selected pictorial representations. In particular, in some embodiments, the facility first filters the pictorial representation selection table by the trip ID of the selected trip, then joins this filtered version of the pictorial representation selection table with the pictorial representation metadata table. For example, based on rows 814, 812, and a 23 of the pictorial representation metadata table shown in FIG. 8, the selections shown in FIG. 18 this set of metadata tags: setting:beach, lodging:home, and food:Mexican. Where the selected pictorial representations are weighted, the facility similarly weights the metadata tags it obtains to reflect the weights of the corresponding selected pictorial representations. In act 2304, the facility selects travel choices from the travel choice metadata table to propose for the trip. In particular, in some embodiments, the facility does so using the metadata tags obtained for the trip in act 2303 together with the schedule, budget, geographic range, and any other criteria explicitly specified for the trip by the creating user. In some embodiments, the facility selects a destination location for the trip as part of selecting the travel choices, or separately. Where the facility has attributed weights to the metadata tags in the set, it further uses this information in the selection it performs in act 2304. In act 2305, the facility presents the descriptions of the travel choices selected in act 2304—together with a total cost for the trip calculated by summing the cost of the selected travel choices—as a trip proposal. In act 2306, the facility prompts the user to act on the trip proposal presented in act 2304.

Figure 24:
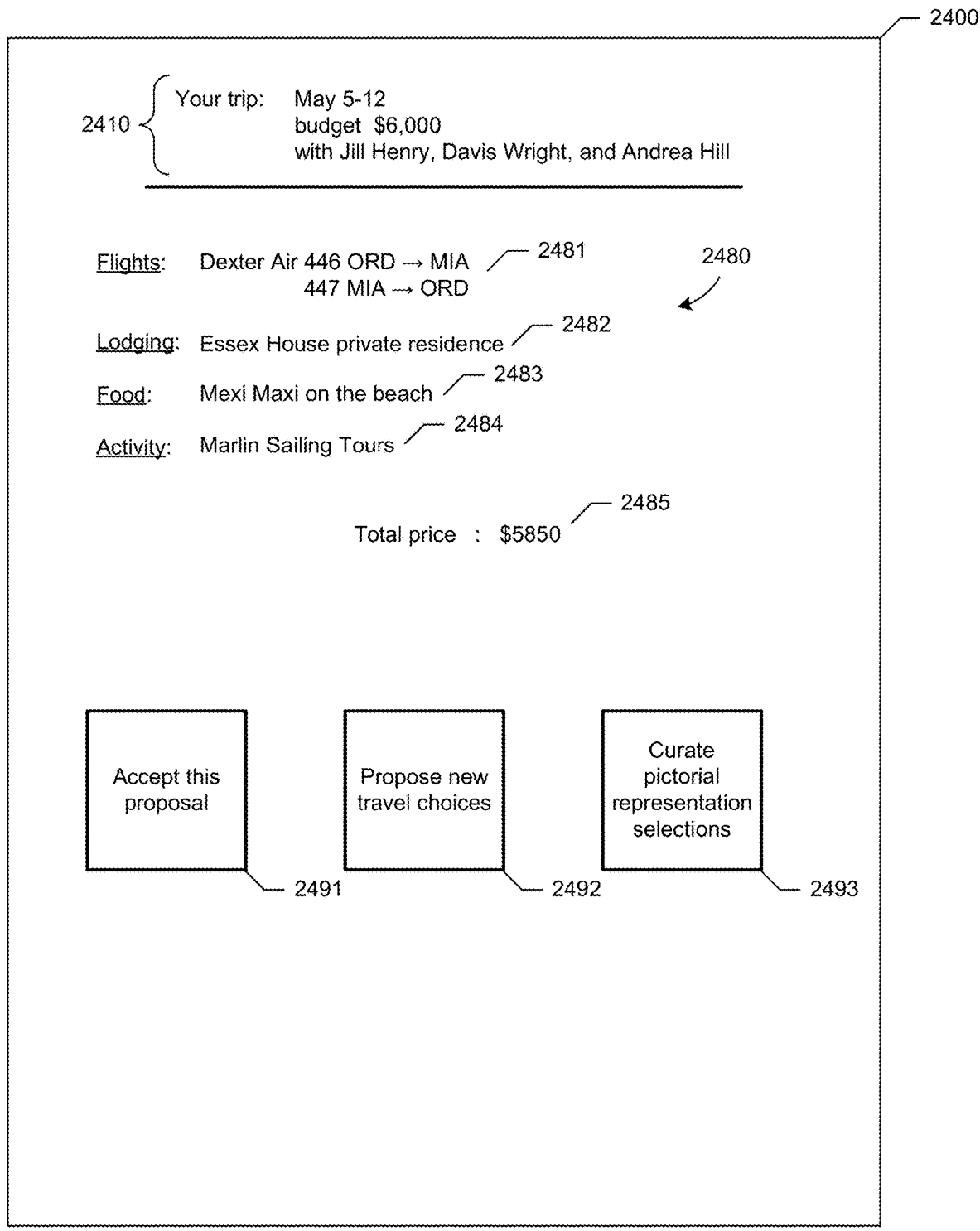
FIG. 24 is a display diagram showing a sample display presented by the facility in some embodiments to present a trip proposal.

FIG. 24 is a display diagram showing a sample display presented by the facility in some embodiments to present a trip proposal. The display 2400 includes information 2410 identifying the trip. The display further contains a trip proposal 2480 for the trip, made up of travel choices 2481-2484, based on the set of three metadata tags listed above. In some embodiments, the user can interact with these proposed travel choices to obtain additional information about them. For example, the user can hover over, click on, or tap the flight travel choice 2481 to obtain departure and arrival times for these flights, seat assignments, etc. The user can interact with the lodging travel choice 2482 to display photos and a description of the named private residence. The user can interact with the food travel choice 2483 to display a menu for the identified restaurant. In some embodiments (not shown), the constituent cost of each of the travel choices is displayed, either initially, or upon interaction with an individual travel choice. The proposal further includes a total price 2485 for the trip proposal. The display also includes an accept proposal control 2491 that the user can activate in order to accept this proposal and book the included travel choices; a request new proposal control 2492 that the user can activate in order to instruct the facility to propose a new set of travel choices from the existing pictorial representation selections; and a curate selections control 2493 that the user can activate in order to curate the pictorial representation selections before proposing a new set of travel choices.

Returning to FIG. 23, in act 2307, the facility responds to the selection of one of the controls for responding to the proposal. If the user activates the accept proposal control 2491, the facility continues in act 2308 to book the travel choices selected in act 2304, such as by using the booking information stored by the facility for the travel choices in the travel choice table. In act 2309, the facility notifies each of the participating users of the resulting trip plan, such as directly via the facility, via email, via text, via voicecall, etc. After act 2309, this process concludes. In some embodiments, as part of act 2309, the facility presents a celebratory display—such as an animation showing fireworks—to the creating user and/or the participating users. If the user activates the request new proposal control 2492, the facility continues in act 2310 to perform a perturbed version of act 2304 and select travel choices for new proposal. After act 2310, the facility continues in act 2305. If the user activates the curate selections 2493, the facility continues in act 2311 to curate the pictorial representation selections, such as in accordance with FIG. 20 and/or FIG. 21. After act 2311, the facility continues in act 2302 to display the updated set of selected pictorial representations.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

I claim:

1. One or more instances of non-transitory computer-readable media whose collective contents are configured to cause a computing system to perform a user interface method, the method comprising:
   receiving input identifying a group of people who will participate together in a trip;
   for each of the identified people:
      causing to be displayed on a device associated with the person a multiplicity of pictorial representations, each of the displayed pictorial representations conveying one or more travel interests;
      receiving on the device associated with the person input selecting one of the displayed pictorial representations:
      in response to the input selecting one of the displayed pictorial representations, causing the selected pictorial representation, when displayed on each of the devices associated with one of the identified people, to be displayed in a manner that visually reflects that it has been selected by the person,
      wherein, for a first person and a second person among the identified group of people, for user input received on the device associated with the first person selecting a distinguished pictorial representation, the distinguished pictorial representation is displayed on the device associated with the second person together with an indication that it was selected by the first person, the display of the distinguished pictorial representation on the device associated with the second person together with an indication that it was selected by the first person occurring within 5 seconds of receiving the user input received on the device associated with the first person selecting a distinguished pictorial representation.

2. The one or more instances of non-transitory computer-readable media of claim 1, further comprising:
   for the first person and the second person among the identified group of people:
      in response to receiving on the device associated with the first person input selecting one of the pictorial representations displayed on the device associated with the first person, triggering a notification on the device associated with the second person.

3. The one or more instances of non-transitory computer-readable media of claim 1, further comprising receiving input specifying, for a distinguished person among the identified group of people, a relative weight to be attributed to pictorial representation selections by the distinguished person.

4. A method in a computing system to perform a user interface method with respect to an intended trip, comprising:
   receiving an indication that a trip is to be planned for one or more travelers including a first user;
   in response to receiving the indication, causing to be displayed to the first user a multiplicity of pictorial representations, each of the displayed pictorial representations conveying one or more travel interests;
   for each of a plurality of pictorial representations among the displayed pictorial representations:
      receiving user input selecting the displayed pictorial representation;
      in response to receiving the user input, causing redisplay of the displayed pictorial representation in a manner that visually reflects that it has been selected;
      accessing one or more metadata tags associated with the pictorial representation each describing one of the travel interests conveyed by the pictorial representation;
      collecting the accessed metadata tags as a basis for automatically selecting travel choices to recommend for the trip; and
      using at least a portion of the collected metadata tags to automatically select a geographic destination for the trip.

5. The method of claim 4 wherein each of a first display device and a second display device display pictorial representations among the multiplicity of pictorial representations,
   and wherein user input selecting a first displayed pictorial representation among the plurality of pictorial representations is received via a first input device physically integrated with the first display device,
   and wherein user input selecting a second displayed pictorial representation among the plurality of pictorial representations is received via a second input device physically integrated with the second display device.

6. The method of claim 4, further comprising:
   for a distinguished one of the displayed pictorial representations not among the plurality of displayed pictorial representations selected by the first user, redisplaying the distinguished displayed pictorial representation in a manner that indicates that it has been selected by a second user also among the one or more travelers for whom the trip is to be planned.

7. The method of claim 4, further comprising:
   receiving user input interacting with a distinguished displayed pictorial representation among the plurality of displayed pictorial representations selected by the first user; and in response to receiving the user input interacting with the distinguished displayed pictorial representation, causing redisplay of the distinguished displayed pictorial representation in a manner that visually reflects that it is not selected.

8. The method of claim 4 wherein, for a distinguished displayed pictorial representation among the plurality of displayed pictorial representations selected by the first user, the received user input specifies a non-binary weight to be attributed to the first user's selection of the distinguished displayed pictorial representation.

9. The method of claim 4, further comprising:
in response to receiving user input selecting for a distinguished displayed pictorial representation among the plurality of displayed pictorial representations, adding one or more pictorial representations to the displayed pictorial representations, at least a portion of the added one or more pictorial representations each conveying a travel interest that is related to a travel interest conveyed by the distinguished displayed pictorial representation.

10. The method of claim 9 wherein at least one of the added pictorial representations conveys a travel interest that complements a travel interest conveyed by the distinguished displayed pictorial representation.

11. The method of claim 9 wherein at least one of the added pictorial representations conveys a travel interest that narrows a travel interest conveyed by the distinguished displayed pictorial representation.

12. The method of claim 4, further comprising using at least a portion of the collected metadata tags to automatically select a plurality of travel choices for the trip.

13. The method of claim 12, further comprising causing each of the plurality of selected travel choices to be reserved on behalf of the one or more travelers.

14. A user interface method, comprising:
receiving input identifying a group of people who will participate together in a trip;
for each of the identified people:
causing to be displayed on a device associated with the person a multiplicity of pictorial representations, each of the displayed pictorial representations conveying one or more travel interests;
receiving on the device associated with the person input selecting one of the displayed pictorial representations:
in response to the input selecting one of the displayed pictorial representations, causing the selected pictorial representation, when displayed on each of the devices associated with one of the identified people, to be displayed in a manner that visually reflects that it has been selected by the person,
wherein, for a first person and a second person among the identified group of people, for user input received on the device associated with the first person selecting a distinguished pictorial representation, the distinguished pictorial representation is displayed on the device associated with the second person together with an indication that it was selected by the first person, the display of the distinguished pictorial representation on the device associated with the second person together with an indication that it was selected by the first person occurring within 5 seconds of receiving the user input received on the device associated with the first person selecting a distinguished pictorial representation.

15. The method of claim 14, further comprising receiving input specifying, for a distinguished person among the identified group of people, a relative weight to be attributed to pictorial representation selections by the distinguished person.

16. One or more instances of non-transitory computer-readable media whose collective contents are configured to cause a computing system to perform a method in a computing system to perform a user interface method with respect to an intended trip, the method comprising:
receiving an indication that a trip is to be planned for one or more travelers including a first user;
in response to receiving the indication, causing to be displayed to the first user a multiplicity of pictorial representations, each of the displayed pictorial representations conveying one or more travel interests;
for each of a plurality of pictorial representations among the displayed pictorial representations:
receiving user input selecting the displayed pictorial representation;
in response to receiving the user input, causing redisplay of the displayed pictorial representation in a manner that visually reflects that it has been selected; and
in response to receiving user input selecting for a distinguished displayed pictorial representation among the plurality of displayed pictorial representations, adding one or more pictorial representations to the displayed pictorial representations, at least a portion of the added one or more pictorial representations each conveying a travel interest that is related to a travel interest conveyed by the distinguished displayed pictorial representation.

17. The one or more instances of non-transitory computer-readable media of claim 16 wherein each of a first display device and a second display device display pictorial representations among the multiplicity of pictorial representations,
and wherein user input selecting a first displayed pictorial representation among the plurality of pictorial representations is received via a first input device physically integrated with the first display device,
and wherein user input selecting a second displayed pictorial representation among the plurality of pictorial representations is received via a second input device physically integrated with the second display device.

18. The one or more instances of non-transitory computer-readable media of claim 16, the method further comprising:
for a distinguished one of the displayed pictorial representations not among the plurality of displayed pictorial representations selected by the first user, redisplaying the distinguished displayed pictorial representation in a manner that indicates that it has been selected by a second user also among the one or more travelers for whom the trip is to be planned.

19. The one or more instances of non-transitory computer-readable media of claim 16 wherein, for a distinguished displayed pictorial representation among the plurality of displayed pictorial representations selected by the first user, the received user input specifies a non-binary weight to be attributed to the first user's selection of the distinguished displayed pictorial representation.

20. The one or more instances of non-transitory computer-readable media of claim 16 wherein at least one of the added pictorial representations conveys a travel interest that complements a travel interest conveyed by the distinguished displayed pictorial representation.

21. The one or more instances of non-transitory computer-readable media of claim 16 wherein at least one of the added pictorial representations conveys a travel interest that narrows a travel interest conveyed by the distinguished displayed pictorial representation.

22. The one or more instances of non-transitory computer-readable media of claim 16 further comprising:
   for each of the plurality of pictorial representations:
      accessing one or more metadata tags associated with the pictorial representation each describing one of the travel interests conveyed by the pictorial representation; and
      collecting the accessed metadata tags as a basis for automatically selecting travel choices to recommend for the trip.

23. The one or more instances of non-transitory computer-readable media of claim 22, further comprising using at least a portion of the collected metadata tags to automatically select a geographic destination for the trip.

24. The one or more instances of non-transitory computer-readable media of claim 22, further comprising using at least a portion of the collected metadata tags to automatically select a plurality of travel choices for the trip.

25. The one or more instances of non-transitory computer-readable media of claim 24, further comprising causing each of the plurality of selected travel choices to be reserved on behalf of the one or more travelers.

\* \* \* \* \*

UNITED STATES PATENT AND TRADEMARK OFFICE
CERTIFICATE OF CORRECTION

PATENT NO. : 10,810,691 B2
APPLICATION NO. : 15/901798
DATED : October 20, 2020
INVENTOR(S) : Brandon Arthur Reed It is certified that error appears in the above-identified patent and that said Letters Patent is hereby corrected as shown below:

On the Title Page

In item (71), in Column 1, delete "Kirland" and insert -- Kirkland --, therefor.

In item (72), in Column 1, delete "Kirland" and insert -- Kirkland --, therefor.

In item (56), in Column 2, under "Other Publications", Line 1, delete "SocialBooker(TM)" and insert -- SocialBooker™ --, therefor.

In item (56), in Column 2, under "Other Publications", Line 4, delete "York [New York]May" and insert -- York, May --, therefor.

On the page 2, in item (56), in Column 1, under "Other Publications", Line 10, delete "York [New York]Oct." and insert -- York, Oct. --, therefor.

In the Drawings

On Sheet 4 of 23, figure 4, reference numeral 402, Line 5, delete "Bonjuor" and insert -- Bonjour --, therefor.

On Sheet 12 of 23, figure 12, reference numeral 1200, Line 2, delete "user user" and insert -- user --, therefor.

On Sheet 12 of 23, figure 13, reference numeral 1300, Line 2, delete "user user" and insert -- user --, therefor.

In the Specification

In Column 1, Line 60, delete "facility" and insert -- facility. --, therefor.

Signed and Sealed this
Fifth Day of January, 2021

Andrei Iancu
*Director of the United States Patent and Trademark Office*

CERTIFICATE OF CORRECTION (continued)
U.S. Pat. No. 10,810,691 B2

In Column 2, Line 30, delete "state" and insert -- state. --, therefor.

In Column 14, Line 4, delete "per-user user" and insert -- per-user --, therefor.

In Column 15, Line 12, delete "voicecall," and insert -- voice call, --, therefor.